Nov. 10, 1953 R. M. MERCIER 2,658,399
AUTOMATIC SPEED VARIATOR DEVICE
Filed Feb. 25, 1948 4 Sheets-Sheet 1

INVENTOR:-
ROBERT MAURICE MERCIER
by: Arnold A Brinton
ATTORNEY.

Nov. 10, 1953 R. M. MERCIER 2,658,399
AUTOMATIC SPEED VARIATOR DEVICE
Filed Feb. 25, 1948 4 Sheets-Sheet 2

INVENTOR:-
ROBERT MAURICE MERCIER.
By: Arnold Johnston
ATTORNEY.

Nov. 10, 1953   R. M. MERCIER   2,658,399
AUTOMATIC SPEED VARIATOR DEVICE
Filed Feb. 25, 1948   4 Sheets-Sheet 3

INVENTOR:-
ROBERT MAURICE MERCIER
By:- Arnold A. Brinton
ATTORNEY.

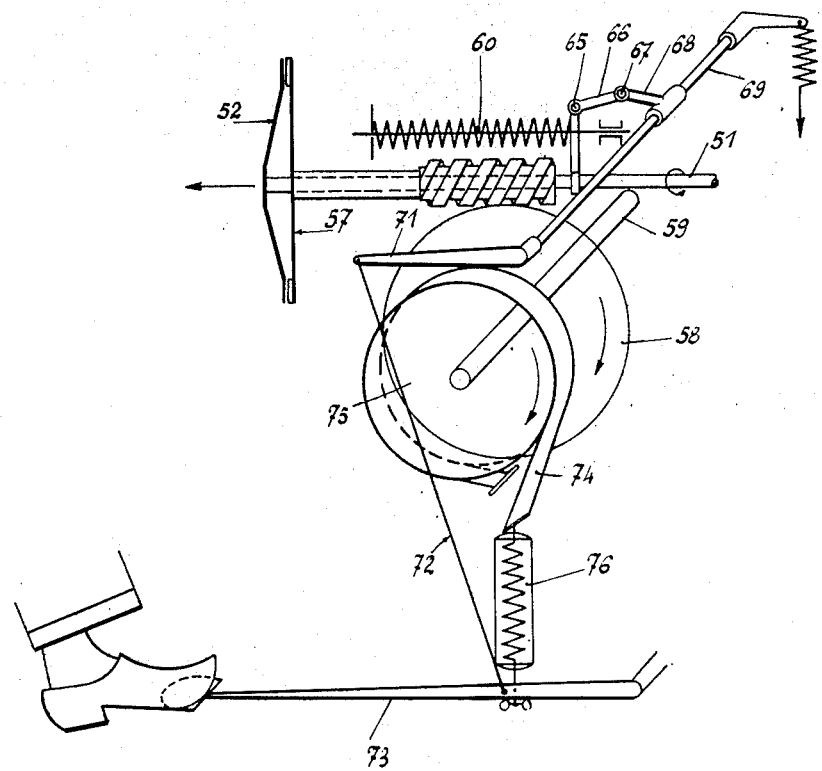

Patented Nov. 10, 1953

2,658,399

UNITED STATES PATENT OFFICE 2,658,399

AUTOMATIC SPEED VARIATOR DEVICE

Robert Maurice Mercier, Paris, France

Application February 25, 1948, Serial No. 10,801
In France September 29, 1942

Section 1, Public Law 690, August 8, 1946
Patent expires September 29, 1962

13 Claims. (Cl. 74—230.17)

My invention relates to automatic speed variator devices, of the type wherein variations in the load torque are adapted to automatically and correspondingly vary the transmission ratio.

The invention comprises a V-belt transmission through driving and driven pulleys wherein both pulleys are adapted to automatically have the useful diameters thereof varied in response to variations in the load torque.

Such automatical and simultaneous variation in the diameters of the pulleys is such that with a constant drive torque it becomes possible to overcome a variable load torque through the automatic modification of the ratio between the respective rates of rotation of the drive and the driven shafts.

It is an object to provide a transmission of the above described character comprising a drive pulley and a driven pulley, each pulley having axially separable flanges defining a V-groove of variable useful diameter therebetween, a V-belt trained about said pulleys through said grooves to transmit torque from one to the other of said pulleys at a variable speed ratio depending on said useful groove diameters, load-responsive means associated with said driven pulley to cause the flanges thereof to assume a variable relative spacing and consequently the groove of said driven pulley to assume a variable useful diameter as a function of the load torque, and compensating spring biasing means of predetermined strength associated with said drive pulley urging the flanges thereof towards each other.

Another object of the invention is to provide in an automatically variable transmission of the kind described, load responsive means acting on said driven pulley to vary the groove diameter thereof comprising a worm gearing adapted to transmit the drive from said driven pulley to an output shaft to which said load is applied, so arranged that the variations in the axial thrust on said worm due to the variations in said load torque are adapted to vary the axial spacing of said driven pulley flanges, together with compensating spring-biasing means associated to said driven pulley to balance said thrust, whereby a given useful diameter of said driven pulley groove corresponds to a given value of said load torque.

A further object is to provide, in combination with an automatically variable transmission of the type described, friction clutch means associated with said driven pulley for engaging and disengaging said driven pulley with and from said output shaft, wherein the means used for providing the necessary clutching friction between the clutching elements of said friction clutch comprise said spring means used for compensating the thrust exerted on said driven pulley through said worm from said load torque.

A further specific object lies in the provision of means, in a transmission of the above described type, for easily adjusting and replacing said compensatory spring-biasing means associated with said drive pulley and or associated with said driven pulley.

A further object of the invention is to provide, in an improved transmission of the type described including said friction clutch means for said driven pulley, an improved control device for operating said clutch. I will now describe some embodiments of my invention as exemplified in the accompanying drawings, given merely by way of illustration and not of limitation and wherein:

Fig. 5 shows in diagrammatic perspective form an improved clutch control means according to the invention.

Figure 1:
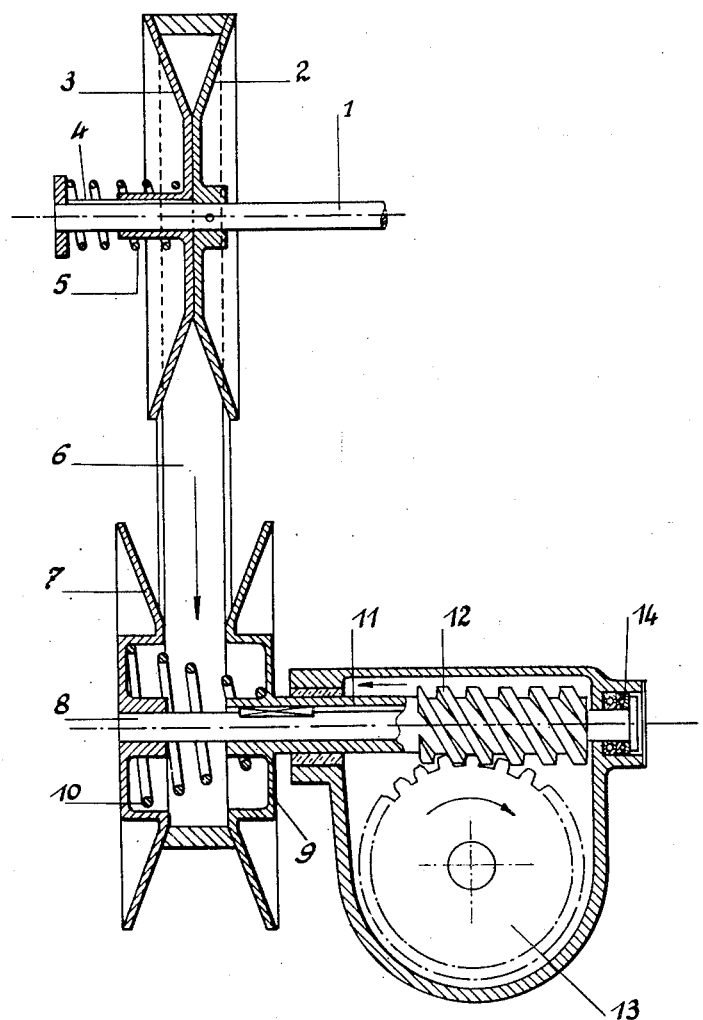
Fig. 1 illustrates in cross-sectional elevation an improved automatically-variable transmission according to a first form of embodiment.

Referring to Fig. 1, the drive shaft 1 carries a pair of sheet metal flanges 2 and 3 forming an expansible grooved pulley or sheave having a trapezoidal or V-shaped groove. The flange 2 is rigidly secured to the shaft whereas the flange 3 is non-rotatably slidable along said shaft, being guided through a sliding keyway 4. A spring 5 urges flange 3 against flange 2 and counteracts the separating action exerted by the V-belt 6. Said V-belt 6 is trained around the drive sheave which also consists of a pair of separable flanges 7 and 9: the flange 7 is rigidly keyed to the shaft 8 and the flange 9 is slidable along the shaft 8 to which it is keyed through a sliding keyway arrangement. A spring 10 interposed between said flanges 7 and 9 constantly urges them away from each other.

The flange 9 is rigid with a bushing 11 carrying a worm 12 meshing wih a driven gear 13. A ball thrust bearing 14 prevents any longitudinal displacement of the shaft 8 which is thus capable of rotating without longitudinal sliding movement; while the assembly including the flange 9, the bushing 11 and the worm 12 is adapted to rotate integrally with the shaft 8 while being also capable of being displaced longitudinally along said shaft.

The speed variator described operates as follows: rotation of the drive shaft 1 rotates the driven sheave 7—9 through the agency of the expansible drive sheave 2—3 and through the belt 6 travelling in the direction indicated by the arrow.

The worm 12 rigid with the driven sheave transmits to the gear 13 the torque received from the drive shaft 1, but the meshing engagement of said worm with the worm-gear 13 generates a longitudinal reaction of the worm, said reaction or thrust assuming the direction of operation to be that indicated in the figure, tending to move the flange 9 closer to the flange 7 and compressing the spring 10.

The reaction being a direct function of the load torque, it will be understood that, provided the spring is suitably selected, there will correspond to each value of the load torque a given degree of compression in the spring and a predetermined spacing between the flanges 7 and 9. Inasmuch as the sheave 7—9 is provided with a V-shaped groove, there will finally result a predetermined useful diameter for the belt, for each value of the load torque.

Such variations in the diameter of the driven sheave 7—9 react upon the drive sheave 2—3 through the medium of the belt 6, the tension of which causes a compression of the spring 5, a separation of the flanges 2 and 3 and an accompanying variation in the useful diameter of the drive sheave 2—3.

Figure 3:
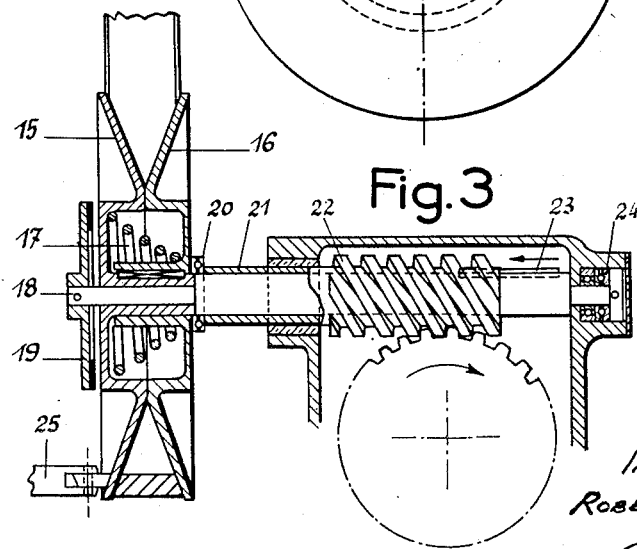
Fig. 3 is a fragmentary view of the driven end of a modified transmission provided with a clutch means according to one aspect of the invention.

Fig. 3 illustrates a modification embodying a drive transmission based on the same principle but combined with a friction clutch carried by the driven sheave.

Figure 2:
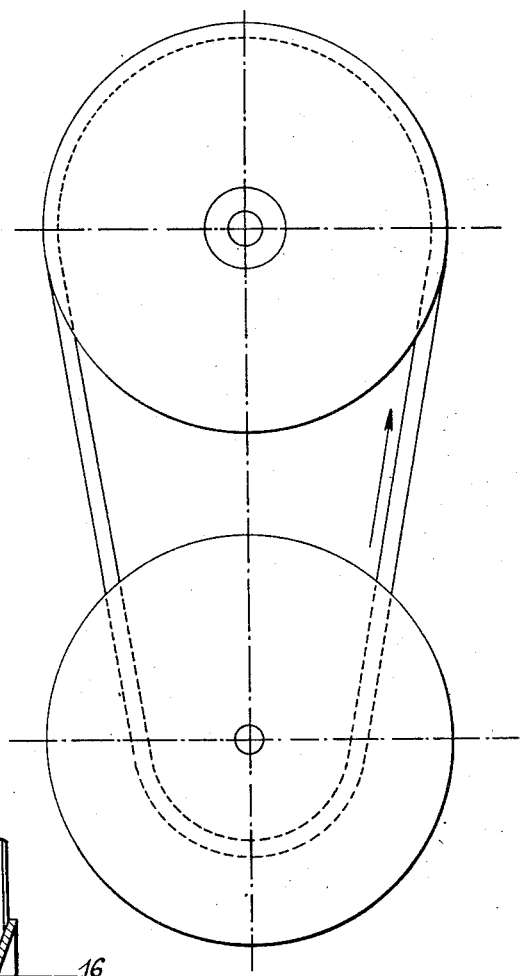
Fig. 2 is a side-view thereof.

The flanges 15 and 16 and their spring 17 form a unit having the same characteristics as elements 7, 9 and 10 in Fig. 2, but capable in addition of freely rotating around the shaft 18.

Said shaft 18 carries a friction plate 19 which upon engaging the flange 15 is adapted to form in effect a friction clutch. A ball thrust bearing 20 provides for free rotation of the unit 15, 16, 17 with respect to the bushing 21 and the worm 22, while enabling transmission of the longitudinal thrusts. A slide keyway 23 rigidly connects in rotation the worm 22 with the shaft 18 and a ball thrust bearing 24 restricts the longitudinal displacements of the shaft 18. It will thus be seen that there are available two independent systems on a common shaft: on the one hand, the expansible sheave freely rotatable on the shaft, and on the other hand, the worm with its associated bushing rigid in rotation with the shaft and the friction plate. The spring for spacing the flanges apart serves the dual function of balancing the reaction thrust set up by the load torque, and applying the flange 15 against the clutch plate. A mechanism diagrammatically illustrated by a pusher 25 provided with a follower roller enables such pressure exerted from the flange against the clutch plate to be suppressed and declutching to be effected.

In operation the above described drive transmission is similar to that described in connection with Figs. 1 and 2, but in addition, by acting on the pusher member 25 the flange 15 may be longitudinally displaced, and separated from the plate 19 to produce declutching.

Figure 4:
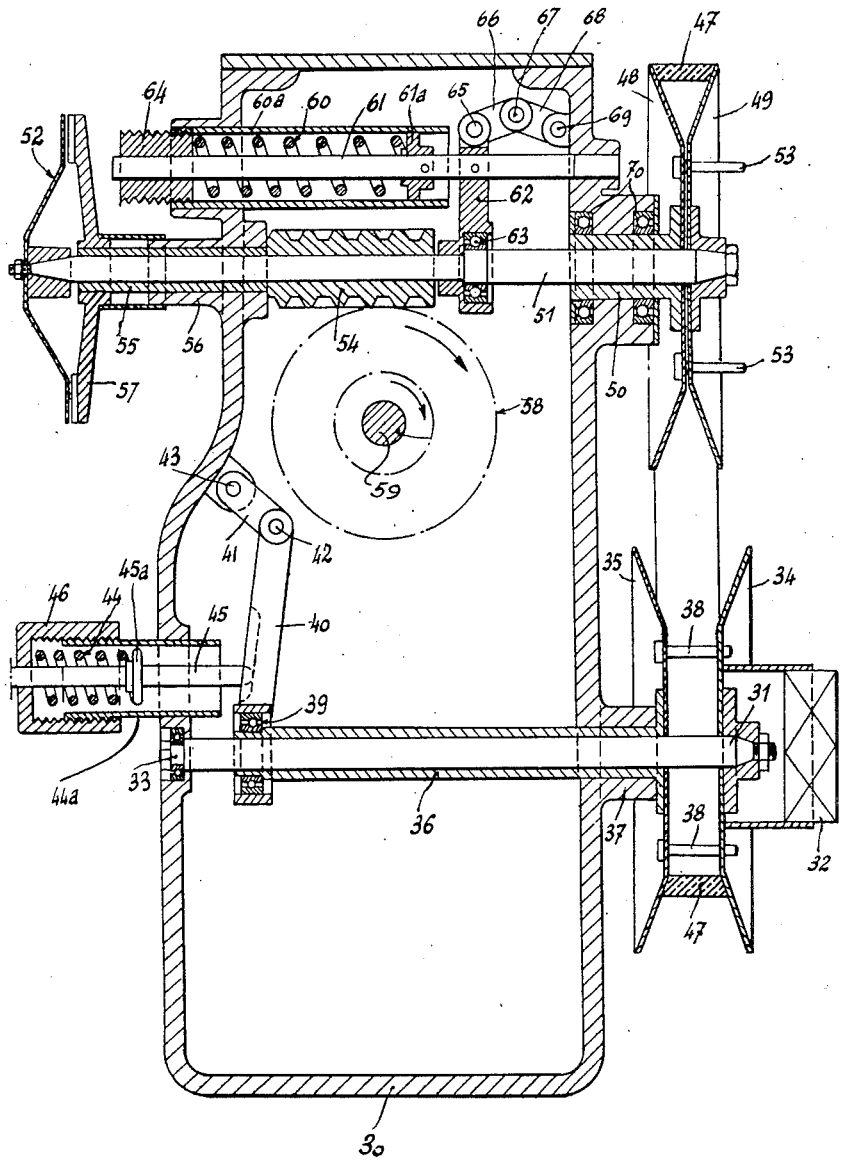
Fig. 4 shows in cross-sectional elevation another embodiment.

Now turning to the embodiment of my invention illustrated in Fig. 4 the drive shaft 31 is connected through a suitable coupling means 32 with a suitable source of power such as an engine (not shown). The drive shaft 31 is mounted to be freely rotatable in the casing 30, being blocked against longitudinal movement in said casing by means of a ball-thrust bearing 33. The shaft 31 carries the drive pulley or sheave consisting of a fixed flange 34 keyed on the shaft 31 and a movable flange 35 rigidly connected with a bushing 36 slidable on the shaft 31 and also rotatable in the bearing portion 37 formed on the casing 30. Pins such as 38 are provided to connect both flanges 34 and 35 in rotation together while allowing the flange 35 to be axially displaced with respect to the flange 34. The bushing 36 is provided with a ball bearing 39 on the free or inner end thereof. The outer race of the bearing 39 is, as shown, connected with a link 40 the other end of which, in turn, is pivoted, as at 43, to a part of the casing 30. A compression spring 44 (corresponding with the spring 5 in the embodiment of Fig. 1) is mounted in a tubular housing 44a integral or connected with a side wall of the casing 30 and cooperates with a push-rod 45, formed with a shoulder 45a, abutting the spring 44 and acting on the link 40. It will readily be understood from a study of the drawing that the action of the spring 44 on the link 40 will, through the associated ball-bearing 39 and bushing 36, cause the movable flange 35 to be urged towards the fixed flange 34 of the drive pulley and that its action is thus similar to that of the spring 5 in connection with the flanges 3 and 2 of the Fig. 1 embodiment, even though said action is now indirectly rather than directly effected as in Fig. 1. Thus the spring 44 tends to balance the axial thrust exerted against the movable flange 35 by the V-belt. An adjusting cap 46 threadedly mounted on the outer end of the spring housing 44a serves to adjust the compensatory biassing action of the spring 44. Such adjustment may easily be effected even when the transmission is operating.

A V-belt 47 is trained around the drive pulley over the groove defined by the flanges 34 and 35 thereof, and is also similarly trained about the driven pulley, at the driven end of the transmission now to be described.

The driven pulley comprises a fixed flange 48 secured to a bushing 50 which is rotatably mounted in ball-bearing 70 in the casing 30, and a movable flange 49 keyed on a shaft 51 which is axially slidable within the bushing 50. The shaft 51 extends through the casing 30 and supports element 52 of a friction clutch device, which may be of any suitable type, on the opposite end thereof. Both flanges 48 and 49 are interconnected for rotation through pins such as 53.

A worm 54 extended by a bushing 55 is freely mounted on the shaft 51 being both axially and angularly movable with respect to said shaft and in a bearing portion 56 of the casing. The bushing 55 has keyed thereon a friction clutch element 57 cooperating with the clutch element 52 keyed on the shaft 51. Thus when the complementary clutch elements 52 and 57 are frictionally engaged, it will be seen that the driven pulley 48—49 together with its shaft 51 is drivingly coupled with the worm 54. The worm 54 meshes with a worm gear 58 secured on a shaft 59. The shaft 59 is the output shaft from which the variable speed torque transmitted from the drive pulley 34—35 through the device described, is taken off.

A coil spring 60 extends into the casing 30 through a housing portion 60a adjacent the driven part of the structure. The spring 60 acts on a push rod 61 through a shoulder 61a of the latter. The rod 61 has connected therewith an arm 62 one end of which is connected with the outer race of a ball-thrust bearing 63 secured on the shaft 51, while the opposite end of the arm 62 is pivoted at 65 to one link 66 of a toggle-linkage further including a link 68 pivoted to 66 at 67 and mounted at its free end on a shaft 69 journalled in the casing 30 and projecting therefrom so as to be manually rotatable from outside said casing.

Thus it will be seen that the axial reaction thrust exerted on the worm 54 by the load torque applied to the shaft 59 and gear 58 is balanced by the spring 60 through the rod 61, arm 62 and bearing 63, so that the shaft 51 tends to be displaced in the direction causing the flange 49 to be moved away from the fixed flange 48 and at the same time causing the friction element 52 to be applied against the cooperating element 57. An adjusting cap 64 enables this compensatory action of the spring 60 to be adjusted as desired during the operation of the device.

The relative positions of the friction elements 52 and 57, pulley flanges 48 and 49 and worm 54 are so predetermined that when the worm is in the position shown in Fig. 4 the toggle-linkage 66—68 is nearly in an aligned condition, while the flanges 48—49 are very closely spaced from, without actually touching, each other, thereby providing a maximum reducing ratio through the transmission. It will be understood that if, in this position of the parts, a suitably-directed pivotal movement is imparted to the shaft 69, the toggle linkage 66—68 will operate and, with the worm 54 in abutment against the casing 30 as shown, the shaft 51 will be caused to slide in the worm 54, thereby separating the clutch element 52 from the element 57, in spite of the high opposing pressure of the spring 60.

Fig. 5 illustrates one arrangement for operating the clutch 52—57 according to the invention. In this figure, the main operative parts of the driven portion of the device shown in Fig. 4 have been shown in diagrammatic form and designated by the same numerals as in that figure.

As shown, the previously mentioned toggle operating shaft 69 has secured thereon, outside the casing 30, a lever arm 71 connected as through a flexible connecting element 72 with a foot-lever 73. The output shaft 59 carries a brake drum 75 cooperating with a brake-band 74. The free end of the band 74 is connected with the foot lever 73 through spring 76, providing for a certain amount of freedom between the actuating movements of the foot-lever 73 and the accompanying movements of the toggle-shaft 69, on one hand, and the tensioning movements of the brake band 74, on the other.

The entire device described above in connection with Figures 4 and 5 operates as follows.

Assuming a source of power supplying a uniform drive torque is made to drive the shaft 31 through the coupling 32, and a variable load is applied to the shaft 59, it is clear that any increase in said load torque thrust created by the worm 54 that said worm will be displaced towards the left (as shown in Fig. 4) carrying with it the shaft 51 and compressing the compensatory spring 60. The flange 49 is thereby moved towards the flange 48, thereby increasing the useful diameter of the driven pulley and reducing the useful diameter of the drive pulley since the transmission belt is fixed in length and is therefore operative to separate the flanges 34 and 35 against the opposition of the spring 44.

When the load torque decreases, the reverse occurs.

As a result of such simultaneous variations in the diameters of both pulleys, the transmission ratio is caused to vary as a reverse function of the variations in the load torque applied, just as in the embodiment described in connection with Figs. 1, 2 and 3.

When it is desired to declutch the transmission shown in Figs. 4 and 5 regardless of the load on the shaft 59, the foot-lever 73 is depressed; this produces through the spring 76 and brake-band 74, a retarding action on the output shaft 59. This additional load torque is effective to cause the transmission to assume its low-gear condition shown in Fig. 4. The pedal 73 being further depressed the lever 71 will be actuated through the connection 72 and will partially rotate the toggle shaft 69 which, through the toggle linkage 66—68, will cause the clutch elements 52 and 57 to disengage. It will be observed that, so long as the device is in declutched condition, the pulleys of the transmission are caused to remain in low-gear condition under the action of the toggle-links 66—68.

In engaging the transmission, the initial condition of the parts is that reached in the previously described declutching operation, and, in particular the transmission is in low gear, which is favorable for overcoming the starting load.

To engage the transmission, the operator releases the pedal 73, thus releasing the brake 74 and the lever 71 whereupon the toggle links 66 and 68 will disengage the arm 62. This allows the spring 60 to act on the shaft 51 to urge it to the right (as in Fig. 4), thus applying clutch element 52 against clutch element 57 which is axially abutted due to the meshing engagement of the worm 54 with its gear 58.

It will be observed that the above-described declutching operation, while it requires a compression of the spring 60, is nevertheless adapted to be carried out without undue physical stress from the operator, because such compression of the spring 60 is for the greater part effected by the engine itself and, during the disengaging period of the friction clutch elements, through the agency of the toggle-linkage which forms a stress amplifying leverage.

While there has been illustrated and specifically described in connection with Fig. 4 an embodiment wherein one arrangement for causing the compensatory spring to act on its related pulley is shown at the drive end of the transmission, and another arrangement for the same purpose is shown at the driven end, it is to be distinctly understood that the reverse disposition could be adopted from that shown, or either one of said arrangements could be used at both ends of the transmission.

It will also be understood that, while a worm and worm gear connection has been shown between the driven pulley and the output shaft, it would be possible to substitute therefor a helical gearing of suitable construction to provide an axial thrust similar to that created by the worm in the exemplary embodiments shown.

A number of other constructional modifications in the design and relative arrangement of the parts may be resorted to without exceeding the scope of the invention as defined in the preamble to this specification and in the ensuing claims.

What I claim as my invention and desire to secure by Letters Patent is:

1. A mechanical arrangement for the automatic transmission of variable speeds between a drive shaft and an output shaft; said mechanical arrangement comprising a driven shaft rotatably mounted parallel to the drive shaft, a worm on said driven shaft, a worm gear fixed on the output shaft and meshing with said worm on the driven shaft to impose an axial force on said worm which varies in response to the load applied to the output shaft, a driving pulley of variable effective diameter mounted on the drive shaft and a driven pulley of variable effective diameter mounted on said driven shaft, each of said driving and driven pulleys including an axially movable side and an axially fixed side formed to vary the effective diameter of the respective pulley in response to relative axial displacement of said movable and fixed sides, said movable and fixed sides of each of said pulleys being held against rotation relative to each other, a transmission belt of fixed length trained around said driving and driven pulleys and operably connecting the latter, first spring means operative to continuously urge the movable side of said driving pulley axially toward said fixed side of the driving pulley, second spring means operative to continuously urge said movable side of the driven pulley axially away from said fixed side of the driven pulley, and means operative to couple said movable side of the driven pulley to said worm for axial and rotational movement with the latter, said worm and worm gear being formed so that said axial force on the worm acts in the direction to oppose said second spring means and tends to displace said movable side of the driven pulley toward said fixed side of the latter.

2. A mechanical arrangement according to claim 1; wherein said means operative to couple said movable side of the driven pulley to said worm includes a sleeve coaxial with said driven shaft and integral with said worm and said movable side of the driven pulley.

3. A mechanical arrangement according to claim 1; wherein said driven shaft is held against axial movement and said worm and said movable side of the driven pulley are movable axially relative to said driven shaft with said fixed side of the driven pulley being secured rigidly on said driven shaft; and wherein said means operative to couple said movable side of the driven pulley to said worm includes a sleeve coaxial with said driven shaft and rigidly connected to both said worm and said movable side of the driven pulley.

4. A mechanical arrangement according to claim 3; wherein said second spring means includes a compression coil spring around said driven shaft and interposed between said fixed and movable sides of the driven pulley to directly urge said movable side of the driven pulley axially away from said fixed side of the driven pulley.

5. A mechanical arrangement according to claim 4; wherein said fixed side of said driving pulley is fixed on said drive shaft and said movable side of the driving pulley is axially slidable on said drive shaft and held against rotation relative to the latter; and wherein said first spring means includes an abutment fixed on said drive shaft with said movable side of the driving pulley between said abutment and said fixed side of the driving pulley, and a compression coil spring on said drive shaft between said abutment and said movable side of the driving pulley to directly urge said movable side of the driving pulley toward said fixed side of the latter.

6. A mechanical arrangement according to claim 1; wherein said means operative to couple said movable side of the driven pulley to said worm includes clutch means having a driven element and a driving element, means securing said driving element to said movable side of the driven pulley for rotational and axial movement with the latter, and means securing said driven element to said worm for axial and rotational movement with the latter, said driving and driven elements of the clutch means being urged into operative engagement by the action of said second spring means and by said axial force on the worm.

7. A mechanical arrangement according to claim 1; wherein at least one of said first and second spring means includes a compression coil spring disposed with its axis spaced from and parallel to the axis of rotation of the related one of said driving and driven pulleys, a push rod mounted for axial movement through said coil spring, an abutment on said push rod against which one end of said coil spring bears, an axially adjustable member bearing against the other end of said coil spring to vary the biasing compression in the latter, and means operatively connecting said push rod to the movable side of the related pulley to communicate the force exerted by said coil spring to said movable side of the related pulley whereby the spring force acting on the latter can be varied.

8. A mechanical arrangement according to claim 1; wherein said driving shaft is held against axial movement; and wherein said first spring means includes a compression coil spring supported with its axis spaced from and parallel to the axis of rotation of said driving shaft, a push rod movable axially through said coil spring and having an abutment thereon against which one end of said coil spring bears, an axially adjustable member bearing against the other end of said coil spring to vary the biasing compression in the latter, a sleeve axially movable on said driving shaft and fixed to said movable side of the driving pulley, and a link pivotally supported at one end and pivotally connected to said sleeve at its other end, said pivoted link extending into the axial path of movement of said push rod and engaged by the latter to communicate the force of said coil spring to said sleeve and said movable side of the driving pulley.

9. A mechanical arrangement according to claim 1; wherein said driven shaft is axially movable and said movable side of the driven pulley is fixed on said driven shaft for axially and rotational movement with the latter; and wherein said second spring means includes a coil compression spring supported with its axis spaced from and parallel to the axis of rotation of said driven shaft, a push rod axially slidable through said coil spring and having an abutment thereon against which one end of said coil spring bears, an axially adjustable member bearing against the other end of said coil spring to vary the biasing compression in the latter, a transverse arm connected to said driven shaft to effect axial displacement of the latter in response to movement of said arm, and means connecting said push rod to said transverse arm so that the latter communicates the force exerted by said coil spring to said driven shaft and hence to said movable side of the driven pulley.

10. A mechanical arrangement according to claim 1; wherein said driven shaft is axially movable relative to said fixed side of the driven pulley and said movable side of the driven pulley is secured on said driven shaft for axial and rotational movement with the latter, and said second spring means acts to urge said driven shaft axially in the direction moving said movable side away from said fixed side of the driven pulley; and wherein said worm is rotatable and axially movable relative to said driven shaft, and said means operative to couple said movable side of the driven pulley to said worm includes a driving clutch element fixed on said driven shaft and a driven clutch element connected fixedly to said worm, said driving and driven clutch elements being disposed in side-by-side relationship and urged together into clutching engagement by the force exerted by said second spring means and by said axial force on the worm.

11. A mechanical arrangement according to claim 10; further comprising stop means for limiting the axial movement of said worm and the driven clutch element in the direction of said axial force on the worm, and control means operative to overcome the force exerted by said second spring means and to displace said driven shaft in the direction moving said driving clutch element out of engagement with respect to said driven clutch element when the axial movement of said worm and driven clutch element is arrested by said stop means.

12. A mechanical arrangement according to claim 11; further comprising brake means operatively associated with the output shaft for increasing the load on the latter to cause said driving and driven pulleys to effect a low transmission ratio prior to disengagement of said driving clutch element from said driven clutch element.

13. A mechanical arrangement according to claim 11; including a transverse arm extending from said driven shaft and serving to communicate the force exerted by said second spring means to said driven shaft; wherein said control means includes a toggle assembly connected to said transverse arm and operative, when straightened, to displace said transverse arm in the direction opposed by said second spring means, a rockable shaft connected to said toggle assembly for straightening the latter; and wherein said brake means includes a brake drum on said output shaft, a brake band in frictional engagement with said drum, an actuating member, means connecting said brake band to said actuating member so that displacement of the latter in one direction is effective to increase the frictional force applied by said band against the brake drum, and means connecting said rockable shaft to said actuating member so that displacement of the latter in said one direction is also effective to straighten said toggle assembly for disengaging the driven and driving clutch elements.

ROBERT MAURICE MERCIER.

References Cited in the file of this patent

UNITED STATES PATENTS

| Number | Name | Date |
|---|---|---|
| 583,402 | Reeves | May 25, 1897 |
| 834,212 | Lohr | Oct. 23, 1906 |
| 1,279,547 | Hueber | Sept. 24, 1918 |
| 2,096,431 | Keller | Oct. 19, 1937 |
| 2,101,845 | Fraser | Dec. 14, 1937 |
| 2,109,247 | Clay | Feb. 22, 1938 |
| 2,150,456 | Perrine | Mar. 14, 1939 |
| 2,175,047 | Acker | Oct. 3, 1939 |
| 2,496,201 | Dodge | Jan. 31, 1950 |

FOREIGN PATENTS

| Number | Country | Date |
|---|---|---|
| 509,765 | Germany | Oct. 2, 1930 |